(12) United States Patent
Kibilov et al.

(10) Patent No.: US 7,546,539 B2
(45) Date of Patent: Jun. 9, 2009

(54) BROWSER BACK AND FORTH NAVIGATION

(75) Inventors: George G. Kibilov, Santa Clara, CA (US); Jieping Lu, Foster City, CA (US); Dakun Lin, Foster City, CA (US)

(73) Assignee: Siebel Systems, Inc., San Mateo, CA (US)

( * ) Notice: Subject to any disclaimer, the term of this patent is extended or adjusted under 35 U.S.C. 154(b) by 0 days.

(21) Appl. No.: 10/897,176

(22) Filed: Jul. 21, 2004

(65) Prior Publication Data

US 2005/0204292 A1    Sep. 15, 2005

Related U.S. Application Data

(60) Provisional application No. 60/552,073, filed on Mar. 10, 2004.

(51) Int. Cl.
*G06F 3/00* (2006.01)
(52) U.S. Cl. .................. 715/760; 715/712; 715/738; 715/745; 715/817; 715/853; 715/854; 715/855
(58) Field of Classification Search .............. 715/738, 715/744–745, 760, 853–855, 513, 780, 712, 715/817
See application file for complete search history.

(56) References Cited

U.S. PATENT DOCUMENTS

| | | | | |
|---|---|---|---|---|
| 6,094,662 | A * | 7/2000 | Hawes | 707/104.1 |
| 6,912,715 | B2 * | 6/2005 | Gao et al. | 719/311 |
| 6,925,459 | B2 * | 8/2005 | Cornell et al. | 707/3 |
| 6,944,827 | B2 * | 9/2005 | Gao et al. | 715/738 |
| 2002/0194222 | A1 * | 12/2002 | Kaply et al. | 707/513 |
| 2003/0066031 | A1 * | 4/2003 | Laane | 715/513 |
| 2004/0003346 | A1 * | 1/2004 | Blaschke et al. | 715/501.1 |
| 2004/0024848 | A1 * | 2/2004 | Smith et al. | 709/219 |
| 2004/0143564 | A1 * | 7/2004 | Gross et al. | 707/1 |
| 2004/0167878 | A1 * | 8/2004 | Doddington | 707/3 |
| 2005/0257131 | A1 * | 11/2005 | Lim et al. | 715/501.1 |

* cited by examiner

*Primary Examiner*—Stephen S Hong
*Assistant Examiner*—Sajeda Muhebbullah
(74) *Attorney, Agent, or Firm*—Campbell Stephenson LLP

(57) ABSTRACT

Integration of navigation both external to and internal to web-based applications is disclosed. A hidden history frame is used for storing the desired navigation URL that is intended for adding to the browser history. The hidden history HTML frame is created on the browser when the client side application framework is loaded. Only the navigation entry from the hidden history HTML frame is pushed out to the browser history.

21 Claims, 6 Drawing Sheets

BROWSER BACK AND FORTH NAVIGATION

CROSS REFERENCE TO RELATED APPLICATIONS

This application claims the benefit of U.S. Provisional Patent Application No. 60/552,073 filed Mar. 10, 2004, entitled, "BROWSER BACK AND FORTH NAVIGATION", by Bhatia et al., and which is hereby incorporated by reference in its entirety.

TECHNICAL FIELD

The present invention is directed to web-based applications, and more specifically to the browser history controls for navigation within web-based applications.

BACKGROUND

Web-based applications may include a framework for listing the navigation history performed within the web-based application. In other words, the web application can expose its own browser-like navigation history on the web pages. The browser-like navigation history of the web-based application is herein referred to as the web application history. Such a framework provides a bookmark management system on the server side. Each bookmark is a snap shot of the server-state after a user request is handled. The snapshot is uniquely identified by a server-state id. The server can retrieve a given bookmark by using the server-state id and thus restore the server-state as indicated by the bookmark. The server-state id parameter is maintained both on the client side and on the server side.

On the client side, the server-state id parameter is updated by a value sent from the server each time a user request is processed. The client side framework for maintaining navigation history is adapted to ensuring that any user request that is sent from the client and which is sensitive to the server-state has a server-state id attached to the request. When a user wishes to navigate to a previous page by clicking on the "Back" button, the request for the previous page indicates an old, i.e., non-current, server-state id. Thus, the server can detect if the request is submitted out of context by comparing the current server-state id with the one that is attached to the user request. If the server-state id attached to the request is out of sync with the current the server-state id then the server will use the server-state id attached to the request to locate the bookmark associated with the requested page in order to restore the server context before handling the request.

However, the above bookmark management system in web applications has some drawbacks. First, the book management system as described above is independent of the web browser history. Thus, in the case when a user navigates to content that is external to the web application or submits an HTML form, the web browser history will be inconsistent with the web application history. Such inconsistencies are confusing to the user.

Another problem is in respect to HTML page caching. Web page caching is desirable in most cases because it improves performance by reducing the number of roundtrips to the server for fetching content. However, the web browser may attempt to reuse cached pages even in instances when such reuse is inappropriate. For example, the web browser may reuse an invalid page that was cached at a different session of the same user or of a different user.

Yet another problem is related to the refresh feature of web browsers. In the case when web page is a page used by the user to add items to a shopping cart, each time the user refreshes the page, an item is added to the shopping cart, even though the user did not intend to add to his shopping cart.

Another problem is related to unrecoverable cached web pages. For web applications that maintain state on a server, when the context of a requested page cannot be restored, such a page is an unrecoverable page.

In view of the foregoing, an automated and efficient approach for integrating navigations both external to and internal to web-based applications is needed.

DETAILED DESCRIPTION

Figure 1:
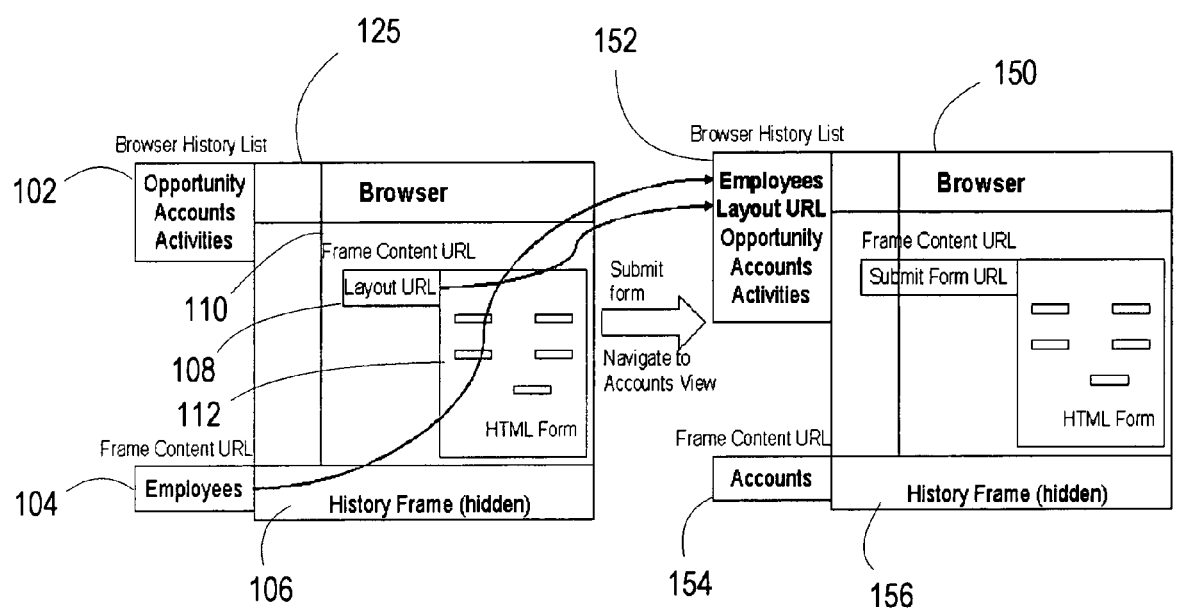
FIG. 1 is a block diagram that illustrates the behavior of the history frame in association with submitting HTML forms, according to certain embodiments of the invention.

A history framework is created, if not already created, for the web-based application. The history framework can be implemented in the form of a hidden history frame. Such a history framework provides a bookmark management system on the server side. Each bookmark is a snap shot of the server-state after a user request is handled and is uniquely identified by a server-state ID. The server can retrieve the bookmark by using the server-state ID and use the bookmark to restore the server-state as indicated by the bookmark.

The server-state ID is maintained both on the client side and on the server side. The client side server-state ID is updated by the value from the server every time a user request is processed. The client side history framework ensures that all the requests sent from client that are sensitive to the server-state have the server-state ID attached. When the user clicks on the browser back button to navigate to a previous page, the request submitted from this page will have an old server-state ID.

The server detects if the request is submitted out of context by comparing the server-state ID on the user request and the one on the server. If out of synchronization is detected, i.e. if the request is submitted from a page the user navigated to by using browser back button, the server will use the server-state ID on the request to locate the bookmark and restore the server context before handling the request.

According to certain embodiments, the web-based application history is integrated with the browser history by adding entries to the browser history every time navigation to new view or page occurs. The URL that is used for the original navigation will be used for the content of the browser cached page. The history index that is mapped to a bookmark id will be utilized to find corresponding bookmark on the server.

According to one aspect of the invention, all requests (URLs) going out to the server are updated on the client with the current server-state ID and will be incremented on the server, unless otherwise instructed in the request. For auxiliary requests, which do not cause server state changes, the server-state ID is not incremented on the server side.

According to another aspect of the invention, time stamps are appended on the client side to all URL-requests that are sent to the server if the URL-requests do not already have time stamps that were generated on the server. In fact, most time stamps on the URL-requests are generated on the client side except for a few corner cases.

According to another aspect of the invention, when a user navigates backwards to a cached shopping cart page and requests a "refresh" on the cached page, the user sees the expected logical view of the shopping cart page without adding another item to the shopping cart. Further, when a user navigates backwards to a cached page and requests a "refresh" on the cached page, the user sees the expected logical view of the cached page rather than a non-requested page.

According to another aspect, users are not allowed to navigate to an unrecoverable page using the browser "Back" button.

For purposes of explanation, assume that the user's browser page includes several HTML frames. Each HTML frame has a current URL to represent the location where the current content is loaded. When a given frame changes its content by loading content from another location, then by default, the current URL will be "pushed out" to the browser history list. As a result, the browser history list is a collection of URLs associated with previously navigated frames on the browser page.

According to certain embodiments, the frame can also load its content using a "replace" mode. When the replace mode is used, the frame can get content from a different URL but the current URL will not be "pushed out" to browser history list from a hidden history HTML frame.

In some web-based applications, the web page is divided into multiple HTML frames with one visible frame containing the main view and multiple supporting frames that are either visible or hidden. For each logical view navigation as perceived by the user, there may be one or more physical navigations in some of these HTML frames. For example, the physical navigation may be for purposes of obtaining data, obtaining the layout, and various other information that are needed to render the view required for the logical view navigation. The user may also perform actions within a view, such as editing a record that can trigger physical navigations in one or more hidden frames on the web page.

Although for each user action there may be one or more physical navigations behind the scenes, the user is only interested in the logical view navigations in the context of using the browser history. As a result, the browser history should contain only logical view navigations. Thus, low-level physical navigations are not to be exposed to the browser history list because the low-level physical navigations are neither atomic nor intuitive to users.

In order to expose only the desired navigation history to the browser history, a hidden history HTML frame is used for storing the desired navigation URL that is intended for adding to the browser history. The hidden history HTML frame is created on the browser when the client side application framework is loaded. Only the navigation entry from the hidden history HTML frame is pushed out to the browser history. Desired navigation history is created by performing navigation using the "new URL" mode. Navigation to all other HTML frames is performed using the "replace" mode to avoid updating the browser history. When the "new URL" mode is used, the new URL becomes an entry in the hidden history by pushing the extant entry in the hidden history frame to the browser history list. When the replace mode is used, the new URL is will replace the current URL associated with the hidden history frame. The current URL that is replaced is herein referred to as the replaced URL. Thus, the replaced URL does not get pushed to the browser history.

According to certain embodiments, a history manager module on the client side is added to ensure that only navigation entries from the hidden history frame are added to the browser history. The history manager module will update the content of the history frame every time there is a physical navigation. When the physical navigation is also a logical view navigation, the URL associated with the current content of the history frame will be added to browser history list, and the current content in the history frame will be saved in the browser cache. When the user navigates to an entry on the browser history list, the corresponding cached content of the history frame, although hidden, will be loaded from the browser cache. On loading the content, the URL to a previous logical navigation will be used to take the user back to a previous view.

For example, the following statement is for opening the document object that holds the content of the history frame. The syntax used in the following statement is merely illustrative. The actual syntax of statements used for opening the document object that holds the content of the history frame may vary from implementation to implementation. The present invention is not limited to any particular syntax.

oNewDoc=document.open (sType, [sMode])

The mode in the above function controls whether the previous logical navigation that is existing in the history frame should be added to browser history or not. When sMode parameter in the above function is set to be "replace", the history frame is modified in "replace" mode and the previous logical navigation in the history frame will not be added to the browser history. If the value of sMode is not specified, the previous navigation in the history frame is added into browser history list as a default action.

Assume that the user is at "logical view A" and then the user navigates to a "new logical view B". Further assume that the user decides to navigate back to logical view A by selecting the browser Back button. Such a selection of the browser Back button causes the cached history frame that corresponds to logical view A to be loaded. The logic associated with managing the history frame will take the user to the desired logical view A by executing the logic view navigation URL for view A in the loaded history frame content.

The following code is an example of how history entries can be added using the client side history manager module.

```
function GenerateHistoryItem(desc, action, replace)
{
// generate time stamp so that will not cause event to fire first time.
var timeStamp = (new Date( )).getTime( );
if (typeof (navigator.SWE__historyKeys) == "undefined")
{
    navigator.SWE__historyKeys = new Object( );
}
if (replace)
{
    Top( ).__swe.__swehist.document.open("text/html", "replace");
}
else
{
    Top( ).__swe.__swehist.document.open("text/html");
}
Top( ).__swe.__swehist.document.writeln("<HTML><HEAD><TITLE>"+
    desc+"</TITLE></HEAD >");
```

-continued

```
Top( ).__swe.__swehist.document.writeln("<BODY onload = \"if
    (navigator.SWE__historyKeys['"+timeStamp+"']) {"+action+"}
    else {
    navigator.SWE__historyKeys['"+timeStamp+"'] = true;}\">");
Top( ).__swe.__swehist.document.writeln("</BODY></HTML>");
Top( ).__swe.__swehist.document.close( );
}
```

The generate-history function takes the following three parameters:

desc—the name of the history entry to be displayed in the browser history list.

action—the URL to be executed when the user accesses this logical navigation using browser back button replace—indicates if the previous logical navigation should not be exposed to the browser history. Some logical view navigations may not be configured for exposure to the browser history list.

The generate-history items function will open the history frame and update its content with the URL passed in as parameter. The passed-in URL is used for getting to the current view when the user navigates back to this page at a later time by using the browser "Back" button. The previous content may be exposed to browser history list if the "replace" parameter is not set to "true".

The following variables used in the function for generating history items play key roles in updating browser history. The following variable names are merely illustrative. The present invention is not limited to any particular variable names.

_swehist—the name of the hidden history frame navigator—is a global browser object that does not get destroyed even upon refresh.

In the generate-history items function, the current timestamp value is assigned to each content update as a unique id. The list of the ids is stored in the global browser object. When the history frame is loaded, the history frame will check if the assigned id of the content of the history frame being loaded is already in the id list to determine if the current page is being rendered for the first time. If the id is not in the list, it means the current content of the history frame is rendered the first time and the id is inserted in the list. When the id is already on the list, it means that the content is loaded from the browser cache, i.e., when the user clicked on the browser back button. In such a situation, the action on the URL associated with the content will be triggered to take the user back to the previous view indicated by the URL.

Calls to the GenerateHistoryItem function are generated even without logical navigation. For example, the user may set focus to a different record or save a modified record. Such actions only changes the server-state on the current view and update the data on the client side without taking the user to a different view. In such cases, only the client logical navigation URL for the current view needs to be updated so that the updated URL will contain a different server-state id and link to the modified view state on the server. To update the URL, the GenerateHistoryItem function is called with the "replace" parameter set to true. By setting the "replace" parameter to true, the client side will not create a new history entry, but instead will update (by replacing) the existing history entry. Such a replacement will continue until next logical navigation occurs.

As an optimization, such "replace mode" updates of the history frame will not be executed on the client side until the user navigates to a different logical view so that the logical navigation is exposed to the browser history.

HTML form submission is handled in a manner to ensure that only navigations from the history frame appear in the browser history. By default, the navigation associated with using HTML form submissions will push the previous navigation associated with the HTML frame that contains the HTML form to the browser history. Using the "replace" mode cannot change this behavior for HTML form submissions. As a result, an undesired URL associated with the form submission is pushed to browser history.

FIG. 1 is a block diagram that illustrates the behavior of the history frame in association with submitting HTML forms, according to certain embodiments of the invention. In FIG. 1, browser view 125 has a number of visible HTML frames, such as the frame 110 associated with HTML form 112. FIG. 1 also shows hidden history frame 106, a Layout URL 108 associated with frame 110. Layout URL is a physical navigation URL to obtain layout data. The current view 104 for browser view 125 as indicated by the history frame 106 is Employees View. The employee view includes the HTML form 112. The Browser history list 102 is shown to the left of browser 125 view.

Assume that a user fills in the HTML form 112 and submits the form. In FIG. 1, browser view 150 shows what happens to the browser list when the HTML form 112 is submitted. When the HTML 112 form is submitted, first, the layout URL is pushed to the browser history list followed by the Employees view URL as shown in the browser history list 152. Assume that the Accounts view 154 is the destination view after submission of the HTML form.

When the HTML form is submitted, the intended behavior is to switch to Accounts View and insert Employees View into the browser history list 152. Because the view navigation is generated from the HTML form submission, the layout URL, a physical navigation that should be hidden from the user, is pushed to the browser history list before the logical URL for the Employees View is added to browser history list 152.

Figure 2:
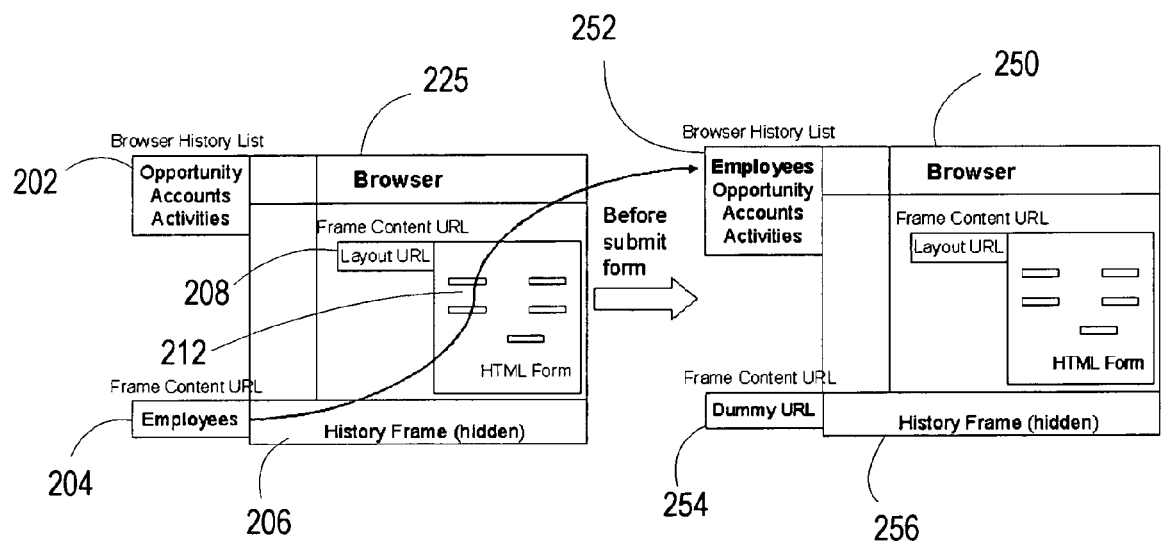
FIG. 2 and FIG. 3 illustrate the use of a dummy URL, according to certain embodiments of the invention.
Figure 3:
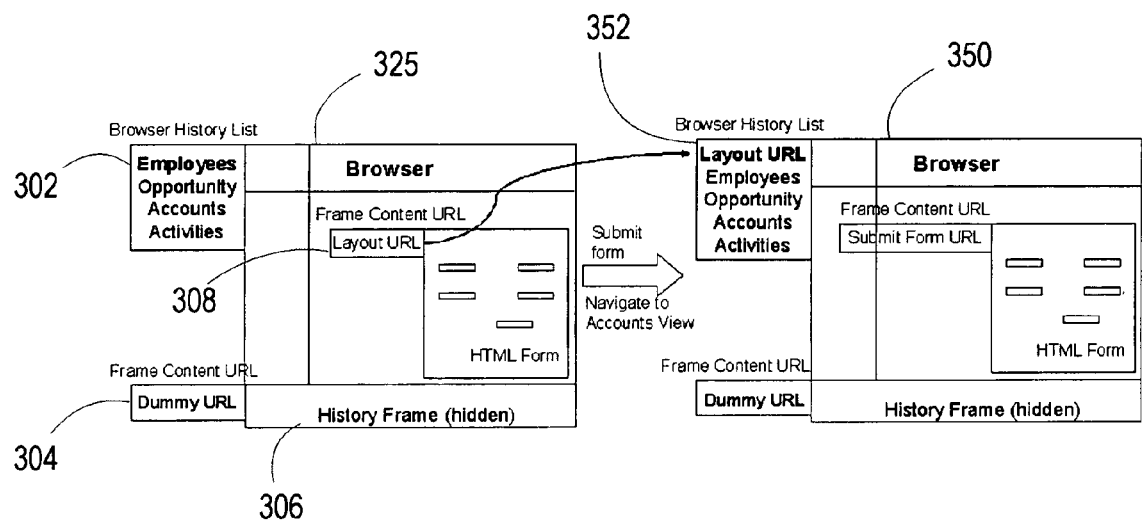

According to one embodiment, the layout URL can be eliminated from the browser history list by adding a dummy history item to history frame whereby the clicking on the browser history back button is simulated programmatically. The dummy history item is added before the HTML form is submitted in order to push out the current view (Employees View in the example) to the browser history list. FIG. 2 and FIG. 3 illustrate the use of a dummy URL, according to certain embodiments of the invention. In FIG. 2, browser view 225 shows browser history list 202, layout URL 208, current view 204 in hidden history frame 206. Current view 204 is Employees View in this example. Browser view 250 shows that a dummy URL 254 can be inserted in history frame 256 so as to push current view 204 (Employees) to browser history list 252 before submitting the HTML form 212. In FIG. 3, browser view 325 shows that dummy URL 304 of history frame 306 has pushed out the Employees View URL to browser list 302. Further, browser view 350 shows that layout URL 308 is pushed to the browser history list as shown on browser history list 352 when the HTML form is submitted.

The dummy history item can be generated using the GenerateHistoryItem( ) function discussed before with parameter "action" set to empty.

After the logical navigation is completed, the current history item can be adjusted to remove the undesired Layout history item by jumping back on browser history list programmatically and then updating the history frame to represent the current view, the actual logical navigation triggered by the submit form. Such an action will in effect "cut off" the undesired history item (layout URL in the example) that is pushed out as a result of the form submission. To explain, the client side history manager module will let the browser history jump two steps back to the Employees View. Such an action is performed programmatically, but is logically the same as if the user opens the browser history list and selects the second entry from the top (i.e., selects Employee view). Now the history frame is loaded with the content URL for navigating to the Employees view. Normally, such a loading will trigger navigation to Employees view in the main viewing frame of the browser. However, the navigation is prevented from occurring by a special flag that is previously set to indicate that the history frame content is loaded to update browser history list due to form submission. Such a flag is set on the client side so that the navigation will not happen due to the current history adjustment of jumping back to a previous history item.

Figure 4:
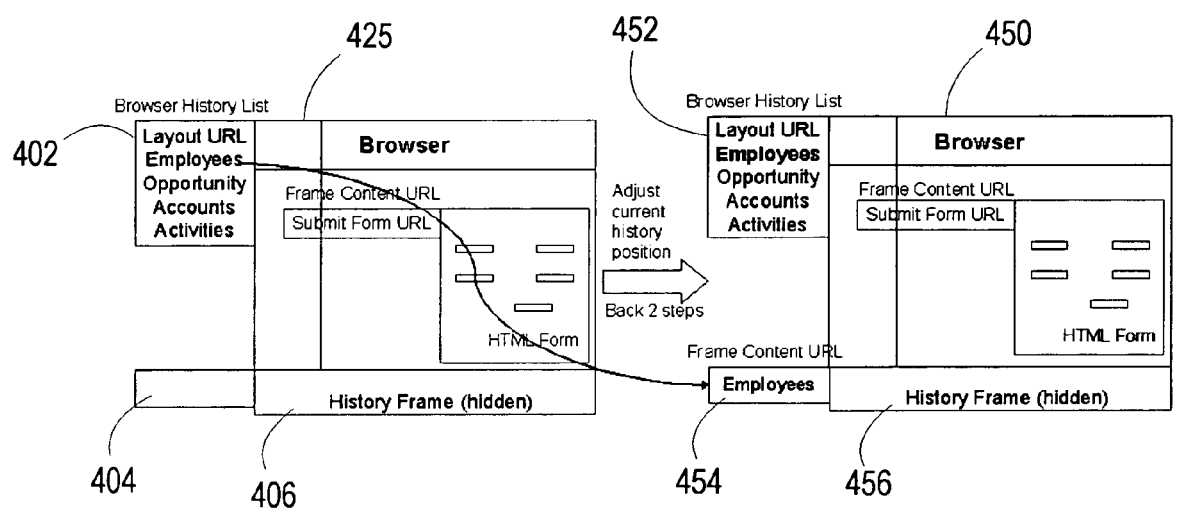
FIG. 4 illustrates the adjustment of the current history item in the history frame after the logical navigation is complete, according to certain embodiments of the invention.
Figure 5:
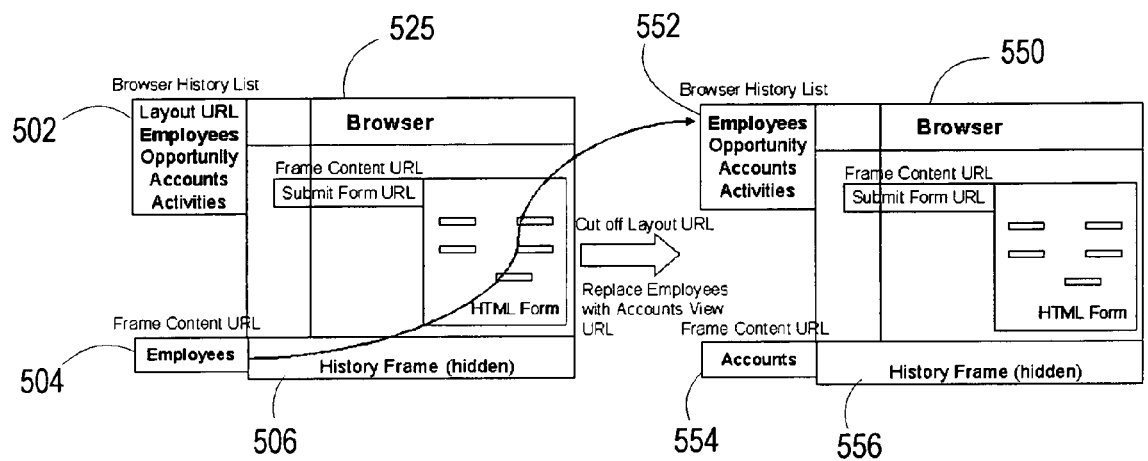
FIG. 5 illustrates the effect of programmatically jumping two steps back on the browser history list, according to certain embodiments of the invention.

FIG. 4 illustrates the adjustment of the current history item in the history frame after the logical navigation is complete, according to certain embodiments of the invention. FIG. 4 shows that after the layout URL is pushed to browser list 402 shown in browser view 425, the current view 404 of history frame 406 can be replaced by the Employees view 454 as shown in history frame 456 in browser view 450. Such a replacement is equivalent to jumping back down to the "employees" entry as shown in the browser history list as illustrated in FIG. 5.

The final step is to cut off the unwanted layout URL from browser history by setting the logical navigation to Accounts View to the history frame. As a result, the Employees View is pushed from the history frame to the browser history list again. This operation is the same as if the user is navigating back to an HTML page (herein referred to as the "backed HTML page") by using the browser history list and then clicking on a link on this backed HTML page. Thus, all the previous history entries appearing on top of the entry corresponding to that backed HTML page are deleted from the browser history list, as they cannot be accessed again. FIG. 5 illustrates the effect of programmatically jumping two steps back on the browser history list for purposes of cutting off the undesired URL (i.e., layout URL in the example), according to certain embodiments. Browser view 525 shows that layout URL is at the top of the browser history list 502. The current view 504 of the history frame 506 is the Employees view URL as a result of the adjustment described above with reference to FIG. 4. Browser view 550 shows that the layout URL is cutoff from the browser history list by navigating to a new view URL such as Accounts view URL, for example. Browser view 550 shows history frame 556 as having the Accounts view in current view 554 and that the employees view URL is pushed out to the browser history list by the new Accounts view URL as shown on browser history list 552.

Figure 6:
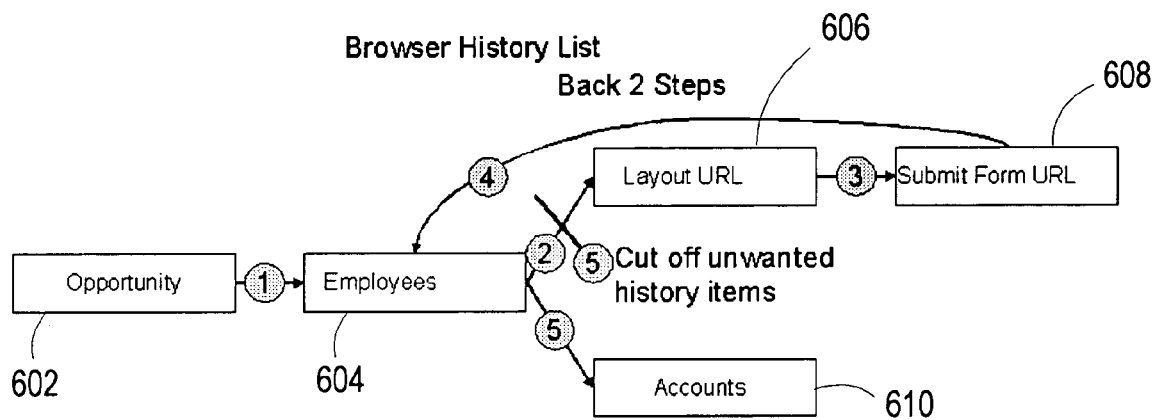
FIG. 6 is a block diagram that illustrates the manner in which an undesirable URL is cutoff from the browser history list, according to certain embodiments of the invention.

FIG. 6 is a block diagram that illustrates the manner in which an undesirable URL is cutoff from the browser history list, according to certain embodiments of the invention. FIG. 6 shows that the user navigates from the Opportunity view 602 to the Employees view 604 that contains the HTML form. The employees URL is pushed out to the browser list by using a dummy URL. Next the history frame current view is populated by the layout URL 606 which gets pushed out to the browser history list when the HTML form is submitted at 608. After the HTML form is submitted, the layout URL is cutoff by navigating to a new logical view, such as account view 610 which is effectively jumping back 2 steps in the browser history list the employees view URL entry on the browser list.

To jump back a certain number of steps in the browser history list, the following code in ActiveX can be used, for example. The syntax used in the following statement is merely illustrative. The actual syntax of statements used for jumping back a certain number of steps in the browser history list may vary from implementation to implementation. The present invention is not limited to any particular syntax.

CComVariant vBack(0-nStep);

hr=spHistory->go (&vBack);

, where nStep is the number of steps to jump back to.

In the above example described with reference to FIGS. 1-5, the history is adjusted only two steps back because:

(1) form submission results in a view navigation, i.e. navigation to Accounts View, for example, and, (2) the current Employees View is not excluded from the browser history list.

If any one of the above 2 conditions is not met, the adjustment described with reference to FIG. 4 should be effectively be equivalent to jumping 3 steps back to the view preceding the view that contained the HTML form. In the above example, the Opportunity view preceded the Employees view that contained the HTML form. After jumping back three steps, a new Employees history item will be used to replace the current Employees history item in the history frame.

With respect to web page caching, there may be situations where the browser may attempt to display an invalid page. To explain, the browser attempts to reuse cached pages in several cases, such as when browser is set to "never" check for newer version of stored pages, or when web/proxy server has its own page caching policy with the expiration of the validity date set for potentially for a long time. Such situations may lead the browser to display an invalid page associated with the same user from a different session, or even from a different user if it is not handled properly.

According to one approach, the "Cache-Control" can be set to "no-cache" in the HTTP response header for any given page that should not be cached. However, such an approach has a significant impact on performance as each user request has to be handled by the server when the user clicks on the back button to fetch a previous page. In addition, such an approach may not work as the user settings on browser or intermediate servers' policies can override such settings.

According to certain embodiments, a unique ID parameter, such as a timestamp, is attached to the request-URLs whose content is not suitable for caching. The use of the unique id ensures that no two request-URLS will be exactly the same. According to certain embodiments, the unique ID is added on the browser side (i.e., client side) before the request-URL is submitted. Adding the unique id on the browser side will prevent the browser from fetching a cached page of a different session for a given URL if the two URLs happen to be the same but for the unique id.

According to certain embodiments, the following is used in the history framework:

Make request-URLs unique by attaching a timestamp to the request on the client side. Making the request-URLs unique will allow the web application to control which responses cannot be cached by the browser for use with the browser back button, and prevent the cached pages from being used in situations where the cached pages are invalid. Thus, stale responses are prevented from being used again.

Set the "Cache-control: private" header whenever possible. The effect of this header will prevent any public cache from caching web server responses. Only the browser can cache web server responses.

Avoid using the no-cache header unless it is necessary to do so. The no-cache header will introduce side effects, such as breaking the browser back button behavior, in some cases. For the cases where the no-cache header must be used, then both versions of the no-cache headers (Cache-control and Pragma) are used to handle both versions of the HTTP protocol.

According to certain embodiments, the server side can also determine if a given request-URL has been previously submitted by checking the unique ID attached to the request-URL. Such an approach is useful in handling requests that are in response to the browser refresh action. Browser refresh is described in greater detail below.

There are some cases in which the browser may require the server side to handle a request with a server-state id that is older than that on the server side:

Case 1. When the user clicks on the browser back button to go back to a cached page and then clicks on a link, such as drill down, on the cached page. This is to submit a new request on a previous page.

Case 2. When the user clicks on the browser back button and the browser is unable to retrieve the corresponding page from the cache (either due to the browser setting, or that the page was not cacheable) or the user clicks the browser refresh button after navigating to a previous page that is cached. This is to submit an old request that the server has previously handled.

Case 3. The user clicks on the browser refresh button on the current page. This is a special case of case 2. No context restoration is needed because the client and server are still in sync.

The server side should be able to identify these three cases and handle them in different ways. To identify the three cases, we can use the timestamp and the server-state ID on the request. This can be shown in the table below. For example, a Case 3 request will have an old timestamp but the latest Server-state ID.

|  | Case 1 | Case 2 | Case 3 |
|---|---|---|---|
| Timestamp | new | old | old |
| Server-state ID | previous | previous | latest |

To handle a request in general, the server side needs to follow the 3 steps (1) Context restoration from bookmark
(2) Invoke the method in the request
(3) Show the result page Due to the different nature of the above 3 cases, some of the steps can be omitted. This is shown in the table below. The "X" mark in each cell means that the step is required for that case.

|  | Case 1 | Case 2 | Case 3 | Normal |
|---|---|---|---|---|
| Context restoration | x | x |  |  |
| Invoke the method | x |  |  | x |
| Show the result page | x | x | x | x |

The drill-down on a cached page can be handled correctly on the server side by using a server-state ID on the request-URL. In such a case, the following sequence of actions can be adopted:

1. Confirm that the request-URL of type case 1.
2. Find the bookmark (as indicated by the request-URL server-state ID) that corresponds to the view in which the drill-down is invoked
3. Build view of the page using the bookmark
4. Invoke the drill-down method
5. Show view of the drill-down page Similarly, when the user attempts to refresh an "add-to-shopping cart" page, the following sequence of actions can be executed on the server, according to certain embodiments of the invention.

1. Confirm that the request-URL matches the pattern of case 2
2. Find the bookmark that corresponds to the view of the "Add to shopping cart" page
3. Build view of the "Add to shopping cart" page using the bookmark
4. Show view of the "Add to shopping cart" page The feasibility of the approach for handling requests that are in response to the browser refresh action is based on the following factors:

1. The requests that are triggered by a user's attempt to refresh a cached page arrived at by using the browser back button can be determined by analyzing the value of the server-state ID and the timestamp attached to the request (the server-state ID and time stamp are attached to user requests). Further, the bookmark for the view that corresponds to the request-URL can be determined. For requests that do not modify the server-state id, the bookmark id is the server-state id attached to the request.
2. As no method invocation is needed in refresh case (case 2), the bookmark of the destination view, i.e. the view that needs be displayed as a result of invoking the request can be found by using the following approach, according to certain embodiments:
    (1) Add a "trigger server-state count" field to the bookmark and set this value to correspond to server-state id of the current browser request each time a new bookmark is created.
    (2) When a request is triggered by the browser back/refresh button, the stored bookmarks are searched in descending order of bookmark id. The first bookmark with "trigger server-state count" field that equals to the server-state id value in the user request will be used to build and show the view in response to the user request.

The above approach may require a new integer-type variable for bookmarks. The use of new integer-type variable can slightly increase the bookmark size. The search for the matching bookmark corresponding to the user request may be slow when the user backs to a page in that is far down in the browser history list. In such a case, a separate array can be used where the index of the array is the server-state ID and the value is the trigger server-state count. Same-view navigation can be optimized by preventing the server from building the same view over again (auxiliary requests).

In the case of navigation to an unrecoverable page, consider the following. When a user clicks on back button in an HTML application, the client side will show the cached page instead of fetching the page from the server. Any request-URL that is submitted from this cached page will contain a server-state ID. Before the request-URL is processed on the server, the server uses the server-state ID attached to the request to locate the bookmark object and restore the context on the client side. If the cached page is a new record page, the server side may not be able to restore the context, due to limitations in the business logic layer.

If the server is unable to restore a new record page, then the solution is to skip the new record page when the user clicks on browse back/forward button, according to certain embodiments of the invention. Skipping the new record page can be accomplished by introducing a latest server-state ID on the client side. Unlike the client server-state ID mentioned before, which is adjusted on the client side every time there is a page refresh (even if the change is caused by back button), the server server-state ID can only be adjusted when a page comes from the server that has the latest server-state ID. Such a server server-state id is increased monotonically on the server at the handling of each user request.

When the new record page is rendered, a function is added to the page to determine if the current page is loaded from browser cache, i.e. browser history list. When executed on the browser when the page is loaded, this function determines if the current page is loaded from browser cache by comparing the server-state ID and the latest Server-state ID. Also by comparing the old client server-state ID and the new client server-state ID, the client side can determine the direction of navigation, i.e. whether the user is using the forward or back button. With this information, the client side can choose to skip the current new record page by going one step forward or backward.

An example function to determine if the current page is loaded from browser cache is listed below. The syntax used in the following statements is merely illustrative. The actual syntax of statements used for determining if the current page is loaded from browser cache may vary from implementation to implementation. The present invention is not limited to any particular syntax.

```
function SWESyncCheck(pageId, errMsg)
{
    if (SWEIsBrowserBack(pageId))
    {
        // client is not in sync with the server
        alert(errMsg);
        if (pageId <= Top( ).SWECount)
            // the user is click on back button
            history.back( );
        else
            // the user is click on forward button
            history.forward( );
    }
}
```

In the function above, SWEIsBrowserBack(pageId) function is used to check if the current page is loaded from browser cache. Top( ).SWECount is the client server-state id of the previous page, and pageId is the client server-state id of the current page.

In the foregoing specification, embodiments of the invention have been described with reference to numerous specific details that may vary from implementation to implementation. The specification and drawings are, accordingly, to be regarded in an illustrative rather than a restrictive sense.

We claim:

1. A method in a computing system for controlling a browser history of a browser for navigation when using a web-based application, the method comprising:

integrating said browser history with a history associated with said web-based application by adding an entry to said browser history for each corresponding logical view navigation to a new HTML page or new logical navigation view of HTML frames associated with said web-based application; and preventing entries of physical navigation of said HTML frames from being added to said browser history, if said physical navigation is not a desired entry for said browser history, such that said browser history contains only logical view navigations, wherein said preventing entries of physical navigation includes performing the following sequence of operations programmatically:

using a dummy URL in a hidden history frame associated with a current view of an HTML form to push a URL of said current view from said hidden history frame to said browser history as a current entry in said browser history before submission of said HTML form, upon submission of said HTML form, adding a physical navigation URL to said browser history without removing said dummy URL from said hidden history frame, wherein said HTML form navigates to a new logical view upon said submission thereof, replacing said dummy URL in said hidden history frame with said URL of said current view without triggering navigation to said current view, and logically navigating to a new view URL in said hidden history frame, thereby removing said physical navigation URL from said browser history and pushing said URL of said current view from said hidden history frame to said browser history so as to reestablish said URL of said current view as said current entry in said browser history, wherein said new view URL is associated with said new logical view resulting from submission of said HTML form.

2. The method of claim 1, further comprising saving content associated with said entry for each corresponding logical view navigation in a browser cache for re-loading said content when a user desires to navigate back to a previous logical view corresponding to said entry using said browser history.

3. The method of claim 1, wherein integrating said browser history includes using a hidden history HTML frame and controlling an order in which entries in said browser history appears to a user of said web-based application.

4. The method of claim 1, further comprising if a user back navigates to a cached page by using a back button of said browser and said user is requesting to drill down to a drill-down page on said cached page, then finding a bookmark corresponding to said drill-down page, building said drill-down page using said bookmark, and presenting said drill-down page to said user.

5. The method of claim 1, further comprising if a user uses a back button of said browser to back navigate to an unrecoverable page for which a corresponding context cannot be restored, then preventing presentation of said unrecoverable page to said user by skipping the unrecoverable page.

6. The method of claim 1, further comprising:

if a user request is to refresh a shopping cart page after a user adds an item to said shopping cart page, then skipping adding another item to said shopping cart page when refreshing said shopping cart page by finding a bookmark corresponding to said shopping cart page, building said shopping cart page using said bookmark, and presenting said shopping cart page to said user.

7. The method of claim 1, further comprising controlling web page caching by using a timestamp.

8. A computer-readable medium carrying one or more sequences of instructions for controlling a browser history of a browser for navigation when using a web-based application, wherein execution of the one or more sequences of instructions by one or more processors causes the one or more processors to perform the acts of:

integrating said browser history with a history associated with said web-based application by adding an entry to said browser history for each corresponding logical view navigation to a new HTML page or new logical navigation view of HTML frames associated with said web-based application; and preventing entries of physical navigation of said HTML frames from being added to said browser history, if said physical navigation is not a desired entry for said browser history, such that said browser history contains only logical view navigations, wherein said preventing entries of physical navigation includes performing the following sequence of operations programmatically:

using a dummy URL in a hidden history frame associated with a current view of an HTML form to push a URL of said current view from said hidden history frame to said browser history as a current entry in said browser history before submission of said HTML form, upon submission of said HTML form, adding a physical navigation URL to said browser history without removing said dummy URL from said hidden history frame, wherein said HTML form navigates to a new logical view upon said submission thereof, replacing said dummy URL in said hidden history frame with said URL of said current view without triggering navigation to said current view, and logically navigating to a new view URL in said hidden history frame, thereby removing said physical navigation URL from said browser history and pushing said URL of said current view from said hidden history frame to said browser history so as to reestablish said URL of said current view as said current entry in said browser history, wherein said new view URL is associated with said new logical view resulting from submission of said HTML form.

9. The computer-readable medium of claim 8, further comprising saving content associated with said entry for each corresponding logical view navigation in a browser cache for re-loading said content when a user desires to navigate back to a previous logical view corresponding to said entry using said browser history.

10. The computer-readable medium of claim 8, wherein integrating said browser history includes using a hidden history HTML frame and controlling an order in which entries in said browser history appears to a user of said web-based application, wherein said order appears intuitive to said user.

11. The computer-readable medium of claim 8, further comprising if a user back navigates to a cached page by using a back button of said browser and said user is requesting to drill down to a drill-down page on said cached page, then finding a bookmark corresponding to said drill-down page, building said drill-down page using said bookmark, and presenting said drill-down page to said user.

12. The computer-readable medium of claim 8, further comprising if a user uses a back button of said browser to back navigate to an unrecoverable page for which a corresponding context cannot be restored, then preventing presentation of said unrecoverable page to said user by skipping the unrecoverable page.

13. The computer-readable medium of claim 8, further comprising:

if a user request is to refresh a shopping cart page after a user adds an item to said shopping cart page, then skipping adding another item to said shopping cart page when refreshing said shopping cart page by finding a bookmark corresponding to said shopping cart page, building said shopping cart page using said bookmark, and presenting said shopping cart page to said user.

14. The computer-readable medium of claim 8, further comprising:

controlling web page caching by using a timestamp.

15. An apparatus configured to control a browser history of a browser for navigation when using a web-based application, the apparatus comprising:

means for integrating said browser history with a history associated with said web-based application comprising means for adding an entry to said browser history for each corresponding logical view navigation to a new HTML page or new logical navigation view of HTML frames associated with said web-based application; and means for preventing entries of physical navigation of said HTML frames from being added to said browser history, if said physical navigation is not a desired entry for said browser history, such that said browser history contains only logical view navigations, wherein said means for preventing entries of physical navigation includes means for performing the following sequence of operations programmatically:

using a dummy URL in a hidden history frame associated with a current view of an HTML form to push a URL of said current view from said hidden history frame to said browser history as a current entry in said browser history before submission of said HTML form, upon submission of said HTML form, adding a physical navigation URL to said browser history without removing said dummy URL from said hidden history frame, wherein said HTML form navigates to a new logical view upon said submission thereof, replacing said dummy URL in said hidden history frame with said URL of said current view without triggering navigation to said current view, and logically navigating to a new view URL in said hidden history frame, thereby removing said physical navigation URL from said browser history and pushing said URL of said current view from said hidden history frame to said browser history so as to reestablish said URL of said current view as said current entry in said browser history, wherein said new view URL is associated with said new logical view resulting from submission of said HTML form.

16. The apparatus of claim 15, further comprising
means for saving content associated with said entry for each corresponding logical view navigation in a browser cache for re-loading said content when a user desires to navigate back to a previous logical view corresponding to said entry using said browser history.

17. The apparatus of claim 15, wherein means for integrating said browser history comprises:
means for using a hidden history HTML frame and controlling an order in which entries in said browser history appears to a user of said web-based application.

18. The apparatus of claim 15, further comprising
if a user back navigates to a cached page by using a back button of said browser and said user is requesting to drill down to a drill-down page on said cached page,
means for finding a bookmark corresponding to said drill-down page,
means for building said drill-down page using said bookmark, and
means for presenting said drill-down page to said user.

19. The apparatus of claim 15, further comprising
means for preventing presentation of an unrecoverable page to a user, if said user uses a back button of said browser to back navigate to said unrecoverable page for which a corresponding context cannot be restored, wherein said means for preventing presentation comprising means for skipping the unrecoverable page.

20. The apparatus of claim 15, further comprising:
means for skipping adding another item to a shopping cart page when refreshing said shopping cart page if a user request is to refresh said shopping cart page after the user adds an item to said shopping cart page, wherein said means for skipping comprising
means for finding a bookmark corresponding to said shopping cart page,
means for building said shopping cart page using said bookmark, and
means for presenting said shopping cart page to said user.

21. The apparatus of claim 15, further comprising:
means for controlling web page caching by using a timestamp.

* * * * *

UNITED STATES PATENT AND TRADEMARK OFFICE
CERTIFICATE OF CORRECTION

PATENT NO. : 7,546,539 B2
APPLICATION NO. : 10/897176
DATED : June 9, 2009
INVENTOR(S) : George G. Kibilov et al.

It is certified that error appears in the above-identified patent and that said Letters Patent is hereby corrected as shown below:

In column 5, line 16, after "button" insert -- . --.

In column 5, line 37, delete "unique id." and insert -- unique ID. --, therefor.

In column 8, line 47, delete "unique id" and insert -- unique ID --, therefor.

In column 8, line 52, delete "unique id" and insert -- unique ID --, therefor.

In column 8, line 55, delete "unique id." and insert -- unique ID. --, therefor.

In column 10, line 11, after "page" insert -- . --.

In column 10, line 22, after "page" insert -- . --.

Signed and Sealed this

Twenty-fifth Day of May, 2010

David J. Kappos
*Director of the United States Patent and Trademark Office*